Dec. 23, 1924.
A. C. HOUGLAND
1,520,244
MEANS FOR COATING FOOD CONTAINERS
Filed Oct. 13, 1922
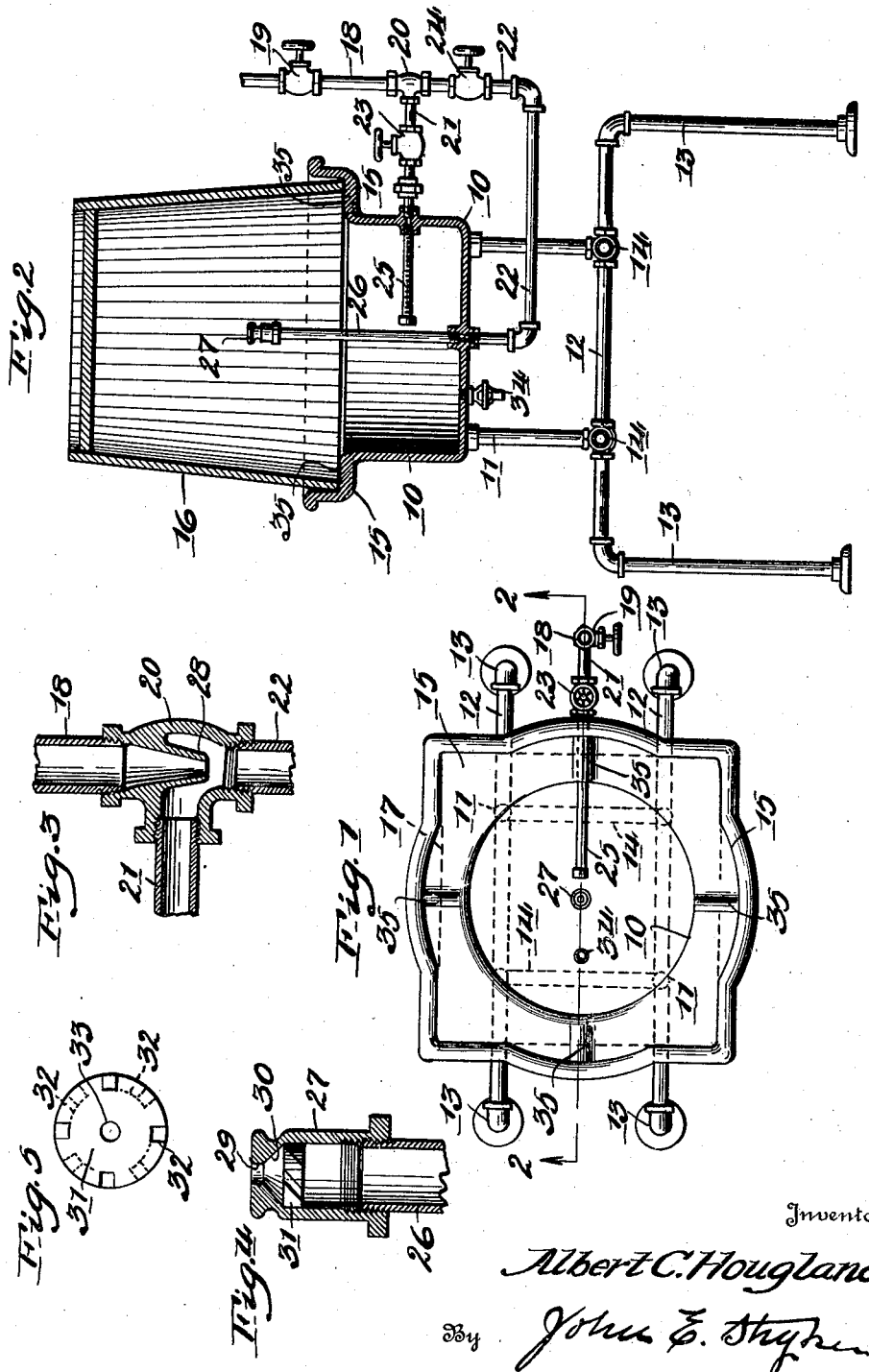
Inventor
Albert C. Hougland,
By John E. Styphen
his Attorney Patented Dec. 23, 1924.

1,520,244

UNITED STATES PATENT OFFICE.

ALBERT C. HOUGLAND, OF ST. PAUL, MINNESOTA, ASSIGNOR TO CRANE COMPANY OF MINNESOTA, A CORPORATION OF MINNESOTA.

MEANS FOR COATING FOOD CONTAINERS.

Application filed October 13, 1922. Serial No. 594,277.

*To all whom it may concern:*

Be it known that I, ALBERT C. HOUGLAND, a citizen of the United States, residing at St. Paul, in the county of Ramsey and State of Minnesota, have invented new and useful Improvements in Means for Coating Food Containers, of which the following is a specification.

It is my object to provide novel, simple and efficient means for applying to food containers a coating which is impervious to air, odors and moisture.

As is well known, wooden butter tubs and boxes and certain other food containers require a coating of paraffin or other impervious material because the wood in its natural state imparts a disagreeable taste to the contents of the container and also because air, if admitted, would soon decompose or otherwise spoil the food.

It has been common practice to place a film or layer of paraffin between the container and food contents, but the means heretofore provided for applying the paraffin have been slow in operation and inefficient in result. It is my object to obviate these defects and to otherwise improve devices of this kind.

A further object of my invention is to provide a device of this kind which is adapted to apply a coating to containers of various shapes and sizes.

Another object of my invention is to combine in a device of this kind, coating means with simple means for steaming the containers prior to the application of the coating material thereto.

More particularly it is my object to provide a simple apparatus in which steam under pressure is used to melt the coating material and also to force the liquid material through a nozzle and thereby apply the coating to the desired surfaces of food containers.

Other objects of my invention will appear and be more fully pointed out in the following specification and claims.

Referring to the accompanying drawings, which illustrate the best form of my device at present known to me, Figure 1 is a plan view of my improved coating machine; Fig. 2 is a section taken on the line 2—2 of Fig. 1; Fig. 3 is a central vertical section of the suction element; Fig. 4 is a central vertical section of the sprayer nozzle, and Fig. 5 is a detail plan view of the disk for imparting centrifugal motion in the nozzle.

In the drawings I have used the numeral 10 to indicate a reservoir for coating material such as paraffin. This reservoir is supported on a frame of steel tubing, which consists of vertical members 11 joined by horizontal members 12 to legs 13. Transverse braces 14 connect the horizontal members 12. Above the reservoir 10 and formed integral therewith is a basin 15 which is adapted to receive either the common type of butter tub 16, or a rectangular butter box 17 (indicated in dotted lines in Fig. 1) in inverted position.

Mechanism is provided in which steam under pressure is utilized to apply the coating material to the interior of tubs or boxes in the basin 15. Steam is supplied through a pipe 18 having a valve 19. A suction element 20, in the form of a T pipe, connects the pipe 18 with a horizontal pipe 21 and also with another pipe 22 leading to the bottom of the reservoir 10. The pipes 21 and 22 are severally provided with valves 23 and 24, respectively, and the pipe 21 communicates with a slotted pipe 25 which projects into the reservoir 10. From the center of the reservoir 10 the pipe 26 projects upward into the tube 16 and is fitted with a sprayer nozzle 27 at its upper end. This pipe 26 communicates, through suitable bosses formed on the reservoir 10, with the pipe 22.

Details of the suction element 20 are shown in Fig. 3. This suction element is of common construction, being provided with a nozzle 28, which, when supplied with steam under pressure by the pipe 18, produces a partial vacuum in the pipe 21. As will be readily understood the steam from the nozzle 28 will force coating material supplied by the pipe 21 as hereinafter described, through the pipes 22 and 26 to the nozzle 27 and then out of said nozzle.

The nozzle 27 is formed at its upper end with an opening 29 and a passageway formed by conical walls 30 communicates with said opening. A disc 31 (Figs. 4 and 5) fastened in the nozzle 27 at the base of the conical walls 30, is formed with peripheral kerfs 32. These kerfs are arranged obliquely relative to the axis of the disc 31 so that they impart centrifugal motion to fluid supplied to the nozzle 27 through the pipe 26. An axial hole 33 in the disc 31 is adapted to apply coating material to the inverted bottom of food containers. The nozzle 27 is thus adapted to spray liquid coating material, in finely divided particles, upon the interior of food containers placed in the basin 15. A drain cock 34 is placed in the bottom of the reservoir 10 for the purpose hereinafter described.

Four ridges 35, formed on the basin 15, are provided to support the containers 16 and 17 and thereby allow steam from the pipes 25 and 26 to escape between said containers and the basin 15.

*Operation.*

In operation a quantity of paraffin sufficient to immerse the pipe 25 or of other coating material which will melt at or below the temperature of steam is placed in the reservoir 10. An inverted tub or box is now placed in the basin 15, as shown in Figs. 1 and 2.

If the apparatus has not just previously been in operation, it is necessary to melt the coating material in the reservoir 10. This is done by opening the valves 19 and 23 (the valve 24 being closed) so that steam is admitted to the reservoir 10 through the slotted pipe 25.

It is frequently desirable to steam the containers prior to the application of coating material thereto. This preliminary treatment not only sterilizes the containers but also opens the pores of the wood and heats it so that it is better adapted to receive the coating. To steam a container it is only necessary to open the valves 19 and 24, the valve 23 being closed.

To apply the coating material, said material being in a liquid state in the reservoir 10, all valves are opened so that the suction element 20 is brought into operation. The coating material will now be withdrawn by suction from the reservoir into the pipe 21 and thence will be forced through the pipes 22 and 26 by the steam. The coating material thus applied to the nozzle 27 will be sprayed upon and will quickly coat the interior of the food container. Any excess material applied to the container will drain from the basin 15 into the reservoir 10. As soon as one container has been properly coated it is removed from the basin 15 and replaced by another, the valve 24 being closed while the containers are substituted one for another. Periodically the cock 34 is opened to drain off the condensed steam from the bottom of the reservoir 10.

Having described my invention what I claim as new and desire to protect by Letters Patent is:

1. Coating apparatus comprising, a reservoir for coating material, means for supporting a container above said reservoir, a pipe arranged to supply steam to said reservoir and to withdraw coating material therefrom, a valve in said pipe, a second pipe connected to said first mentioned pipe and disposed to communicate with a container on said support and a valve in said second pipe.

2. Coating apparatus comprising, a reservoir for coating material, means for supporting a container above said reservoir, a pipe arranged to supply steam to said reservoir and to withdraw coating material therefrom, a suction element in said pipe, a second pipe connected to said first mentioned pipe and disposed to communicate with a container on said support and valves disposed in said pipes to selectively control the injection of steam or coating material into said container through said second pipe.

3. Coating apparatus comprising, a reservoir for coating material, means for supporting a container above said reservoir, a pipe arranged to supply steam to said reservoir and to withdraw coating material therefrom, said pipe being formed with a series of apertures arranged to direct jets of steam into coating material in said reservoir, a second pipe connected to said first mentioned pipe and disposed to communicate with a container upon said support, and valves disposed in said pipes to selectively control the admission of steam or coating material to said container.

4. Coating apparatus comprising a reservoir for containing material, means for supporting containers above said reservoir, and valved pipe adapted to supply steam directly to coating material in said reservoir and to withdraw said material therefrom, a second independently controlled pipe communicating with said first mentioned pipe and adapted to supply steam and coating material to the interior of containers on said support, and means for supplying steam to both of the said pipes.

5. In apparatus of the class described, a reservoir for coating material, means for supporting a container above said reservoir, a pipe arranged to supply steam to said reservoir, a suction element in said pipe, a second pipe extending from said suction element into said container, means arranged on the end of said last mentioned pipe to apply coating material to the interior of said containers, and means for supplying steam to said nozzle and for excluding steam from said first mentioned pipe In testimony whereof, I have hereunto signed my name to this specification.

ALBERT C. HOUGLAND.